Aug. 25, 1925. 1,551,153
S. T. HINDENACH ET AL
TEMPERATURE REGULATOR
Filed March 13, 1922 5 Sheets-Sheet 2
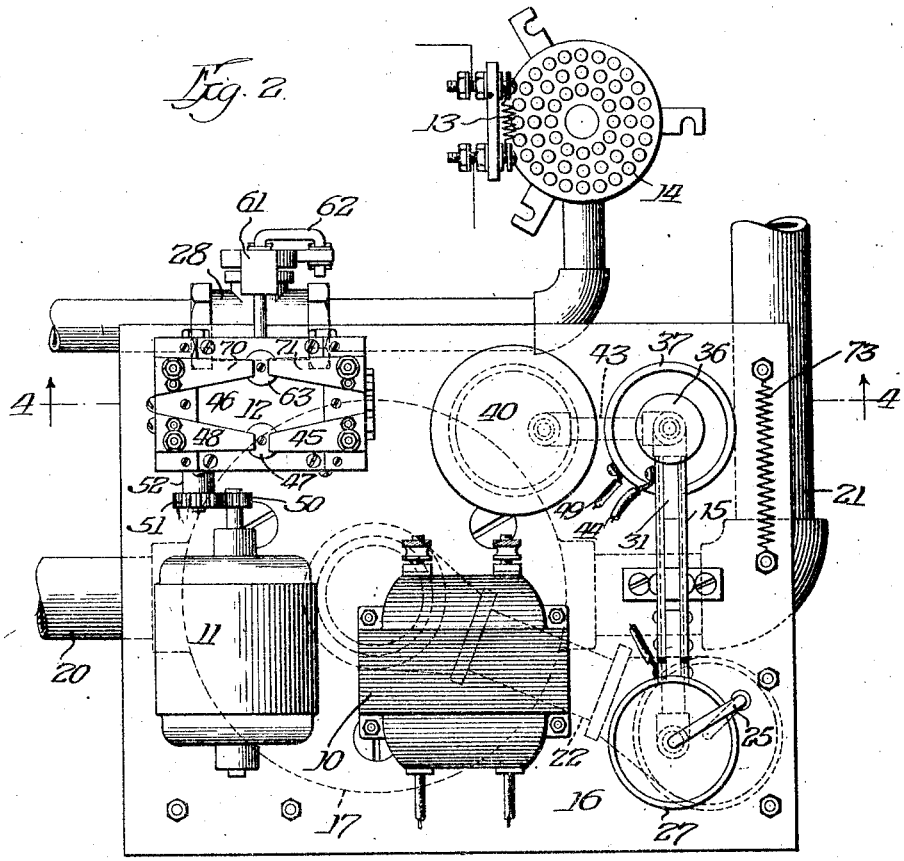
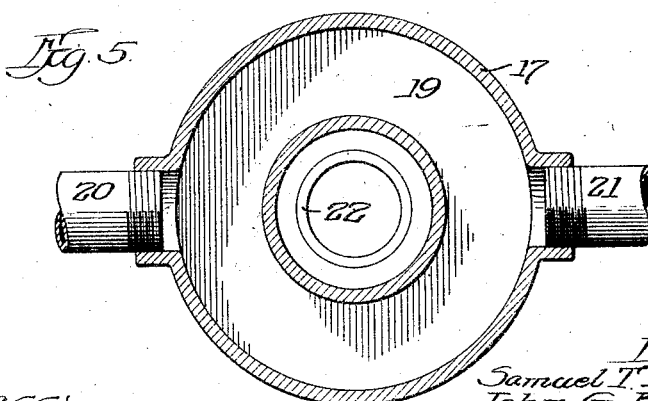

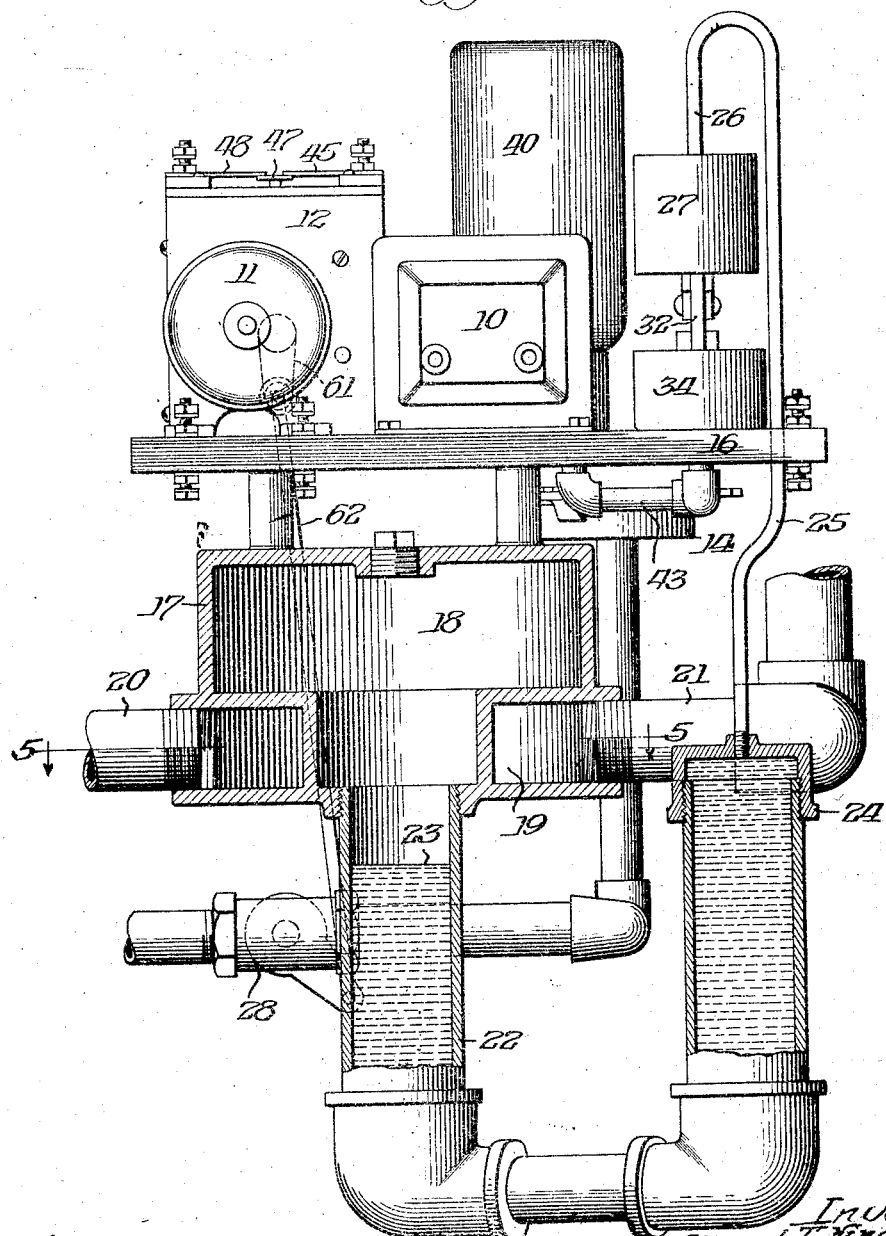

Aug. 25, 1925.  S. T. HINDENACH ET AL  1,551,153
TEMPERATURE REGULATOR
Filed March 13, 1922   5 Sheets-Sheet 3
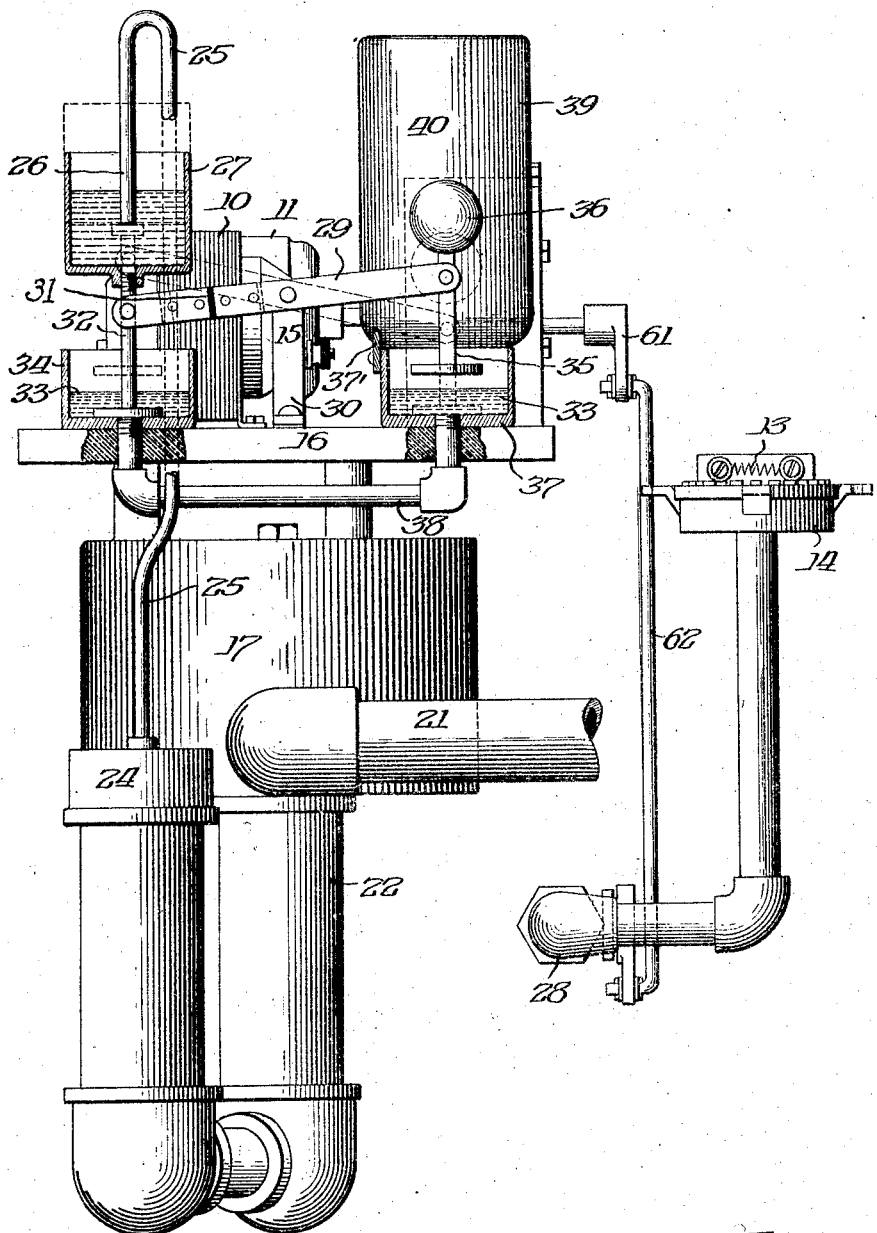

Aug. 25, 1925.  S. T. HINDENACH ET AL  1,551,153
TEMPERATURE REGULATOR
Filed March 13, 1922     5 Sheets-Sheet 4
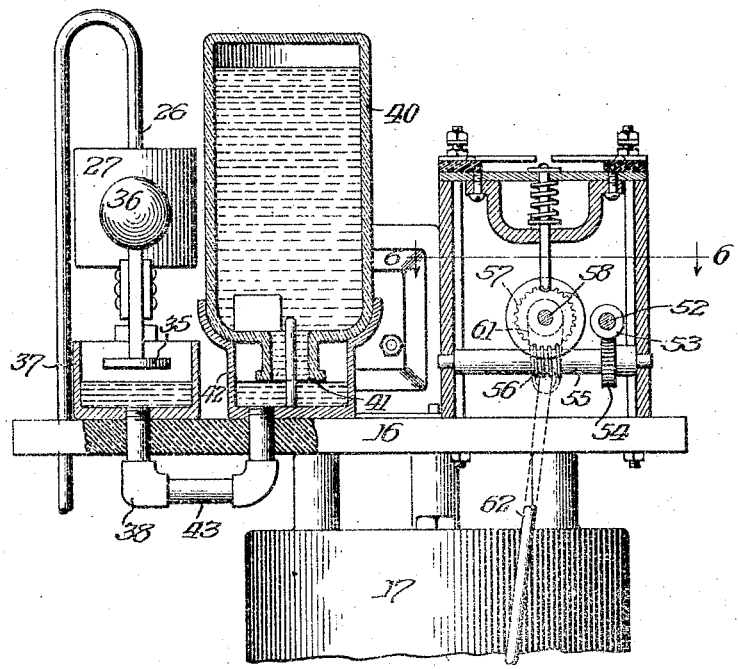
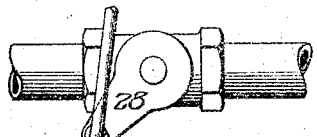
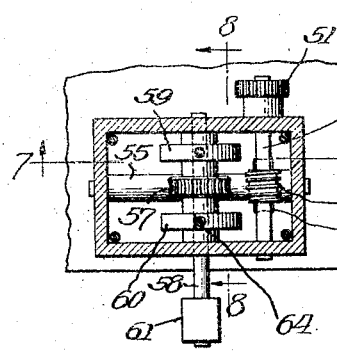
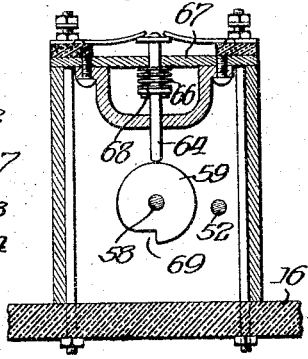
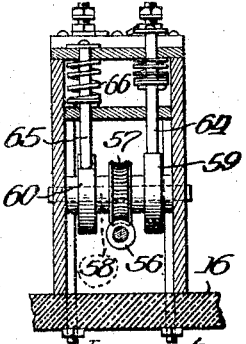

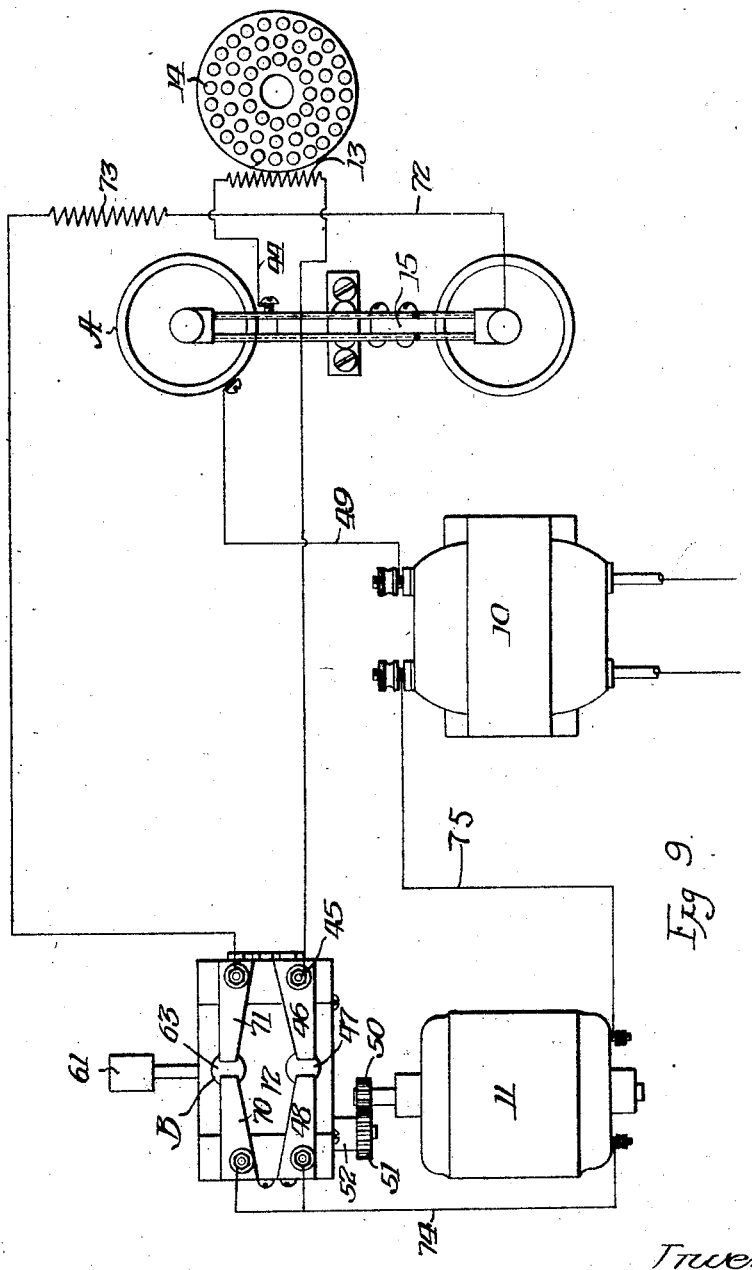

Patented Aug. 25, 1925.

1,551,153

UNITED STATES PATENT OFFICE.

SAMUEL T. HINDENACH, JOHN G. BRADFORD, AND HENRY W. HUNTLEY, OF CHICAGO, AND JULIAN G. GOODHUE, OF EVANSTON, ILLINOIS, ASSIGNORS, BY DIRECT AND MESNE ASSIGNMENTS, TO THE TRUSTEES OF THE ELECTRO THERMOSTATIC CONTROL COMPANY, OF CHICAGO, ILLINOIS, A TRUST ESTATE.

TEMPERATURE REGULATOR.

Application filed March 13, 1922. Serial No. 543,487.

*To all whom it may concern:*

Be it known that we, SAMUEL T. HINDENACH, JOHN G. BRADFORD, and HENRY W. HUNTLEY, citizens of the United States, respectively, residing at 4857 Evans Avenue, 2043 Mohawk Street, and 4244 Greenview Avenue, Chicago, in the county of Cook and State of Illinois, and JULIAN G. GOODHUE, a citizen of the United States, residing at 2714 Thayer Street, Evanston, in the county of Cook and State of Illinois, have invented a certain new and useful Improvement in Temperature Regulators, of which the following is a full, clear, concise, and exact description, reference being had to the accompanying drawings, forming a part of this specification.

The invention relates to temperature regulators and is herein shown and described in conjunction with a heating apparatus wherein the element to be regulated is water which it is desired to maintain at a desired temperature.

The invention has among its various objects the provision of an arrangement whereby the fuel is automatically turned on and ignited when the temperature of the water is lowered and again automatically turned off when the temperature reaches a certain predetermined degree of heat.

In addition to the above, it is an object to provide an arrangement whereby the heat coil is rendered inoperative after the fuel has been ignited and also to provide a means whereby the fuel will be automatically turned off when the water or other commodity to be heated reaches a certain predetermined temperature.

It is also an object of the invention to employ a motor for actuating a valve provided to control the flow of fuel to the burner, and, to arrange this motor in circuit with the heat coil, so that, upon the operation of the motor, the heat coil will be simultaneously thrown into operation, the arrangement being such that, during this period the motor actuates a switch which causes the heat coil, to be extinguished, and the motor to be rendered inoperative with the fuel valve in an open condition and the fuel ignited.

In addition it is an object, to arrange the motor in the circuit so that it will be actuated to cause the fuel valve to be turned off and maintained in this condition should the heat coil be rendered ineffective by the circuit thereto being otherwise opened in any way, subsequently to the ignition of the fuel, and, in addition to provide an arrangement which includes the motor whereby the motor is actuated to turn off the fuel after the medium to be heated reaches a certain degree of heat.

It is a further object of the invention to employ switch construction operable by or under the control of the motor, which will break the circuit to the motor and prevent its further operation, when the fuel valve has reached either an open or closed condition, the position of this valve being determined by the temperature of the medium to be regulated.

Another object of the invention is to accomplish the desired end with electric power of lower voltage than that used in ordinary lighting systems.

It is an added object to employ a thermostat capable of exerting variable pressures in accordance with variations of temperatures of the medium to be heated and to associate with the thermostat, a means preferably fluid which may be acted upon by those various pressures, this fluid body being actuated to control a switch which controls the operation of the device to cause the fuel to be turned on, ignited and extinguished.

In the present structure, two switches are employed, one of which is herein referred to as the primary switch. This primary switch controls the actuation of the device and is in turn controlled by a certain fluid which is caused to act thereon and actuate it. The removal of the action of this fluid from the switch permits the switch to move in the opposite direction, which sets the device in motion. The other or secondary switch is actuated by a motor, the action thereof being controlled by the first named or primary switch. This motor is connected with a valve which is operated thereby to control the flow of fuel to the burner.

Under normal conditions, or when the device is inoperative and at rest, the action of the fluid upon the primary switch causes it to be held in off position, which prevents the actuation of the motor, maintains the valve controlling the fuel in a closed condition and the heat coil in an inactive or extinguished condition. When the commodity to be heated reaches a certain low temperature, the contents of the thermostat are contracted, which removes the action of the fluid from the primary switch, and allows said switch to be thrown into operation, which closes a circuit, heats the coil, actuates the motor and opens the fuel valve, the fuel being ignited by the heat coil. At a certain period of the operation the motor actuates a portion of the secondary switch which breaks the circuit leading to the heat coil and extinguishes it and causes the motor to be brought at rest, with the fuel valve in an open condition.

The heat produced by the ignition of the fuel causes the temperature of the medium to be heated to be increased. This change of temperature of the medium is transmitted to and affects the contents of the thermostat causing it to expand and to exert a pressure upon the fluid, which actuates or controls the primary switch, moving it to close the circuit of the motor, and the latter turns off the fuel valve. At this time a certain portion of the secondary switch is moved by the motor to break the circuit between one side of the primary switch and the motor, which brings the entire structure at rest with the fuel valve closed.

During the shut off operation of the fuel valve and the shut off movement of the primary switch and motor, another portion of the secondary switch is operated and moved by the motor to form part of the circuit leading to the heat coil, in which position this portion of the secondary switch is retained, it being inoperative because of the position, at this time of an element of the primary switch, however, upon the removal of the weight of the fluid from the primary switch, this switch is moved to "on" position and by virtue of the interposition of the last named element of the secondary switch, the circuit leading to the heat coil and motor is closed, which ignites the heat coil, actuates the motor and opens the fuel valve. During this period of the operation the above mentioned element of the secondary switch is moved out of the circuit by the actuation of the motor, which breaks the circuit and cuts out the heat coil and motor and again leaves the fuel valve in an open condition, and brings the device to a state of rest.

Two circuits are employed, one of which includes a transformer, one side of the primary switch and one of the elements of the secondary switch and the motor. The other includes the transformer, the other side of the primary switch and another movable element of the secondary switch and the motor. The two elements of the secondary switch are alternately raised and lowered upon the action of the motor. When the device is at rest, that is, with the fuel valve closed, and the primary switch in an inoperative or off position, one of these elements controls the circuit to the heat coil and the motor and is in a position to complete the circuit upon the movement of the primary switch to "on" position. When the primary switch is moved to an "on" position this element of the secondary switch is moved out of the circuit, simultaneously with the movement of the other element of the secondary switch into position to complete its circuit.

The movement of the first mentioned element of the secondary switch breaks the circuit and stops the device, extinguishes the heat coil and leaves the fuel valve open.

Upon the movement of the primary switch to "off" position the circuit is closed, through the transformer, primary switch, the second mentioned movable element of the secondary switch and the motor which continues to operate moving the second mentioned element of the secondary switch, out of the circuit which breaks or opens this circuit and brings the device to a rest with the fuel valve closed. During this period the first mentioned movable element of the secondary switch is again moved by the motor to close its circuit, which cannot be completed until the primary switch has again been moved to "on" position.

The particular motor employed is of a type generally known as a repulsion motor which is wound to permit part of the current to pass through its commutator and part through the field and thereby allow sufficient current to pass to heat the coil or igniter. Other types of electrically operated motors would serve equally as well as the specific motor described.

The invention will be explained and more readily understood when read in conjunction with the accompanying drawings which illustrate one embodiment of which the invention is susceptible, it being understood that changes and modifications may be resorted to without departing from the scope of the appended claims forming a part hereof.

In the drawings Figure 1 is a front elevation partially in section of a device constructed according to one embodiment thereof.

Figure 2 is a top plan view of the structure shown in Figure 1.

Figure 3 is a view partially in section of the structure shown in Figure 1.

Figure 4 is a section taken on line 4—4 of Figure 2.

Figure 5 is a section taken on line 5—5 of Figure 1.

Figure 6 is a section taken on line 6—6 of Figure 4.

Figure 7 is a section taken on line 7—7 of Figure 6.

Figure 8 is a section taken on line 8—8 of Figure 6.

Figure 9 is a diagrammatical view of the circuit arrangement employed in the structure.

The structure illustrated contemplates the use of a transformer 10, a motor 11, a gear box and mechanical switch 12, a heat coil 13, burner 14, and a thermostatically controlled electric switch generally designated 15. These are all mounted upon the support or insulator 16, below which is arranged the thermostat generally designated 17 which includes the expansion chamber 18 within which, in the present structure, atmosphere is confined. Another chamber 19 is employed and arranged adjacent the chamber 18. This last mentioned chamber 19 is employed and constructed to permit the water in the system to circulate therethrough and affect the temperature of the atmosphere in the expansion chamber 18.

To permit this circulation of water through the chamber 19, pipe connections 20 and 21 are made with said chamber. Another pipe connection 22 is employed which communicates with the chamber 18 and has confined therein a suitable amount of fluid 23, which is preferably oil or some other suitable liquid. The pipe connection 22 is in the present instance of a U shaped formation, it being closed at one extremity by the cap 24, to which is connected the relatively small pipe or passage 25 which extends upwardly to beyond the support 16 and has its end 26 terminating or arranged with relation to the cup or receptacle 27 of the primary switch generally designated 15, so that the oil 23 may be discharged into and extracted from the cup 27 when caused to act in this manner by the pressure caused by the expansion and contraction of the contents of the expansion chamber 18.

The pressure existing in the chamber 18 is varied according to the temperature of the water flowing through the chamber 19 and throughout the system.

It is evident that when relatively cold water is passed through the chamber 19 that the atmosphere in the chamber 18 will be contracted which will reduce the pressure existing in the chamber 18 and allow the oil 23 in the pipe connections 22 to move towards the chamber. This action of the oil 23 will cause that contained in the container 27 to be extracted therefrom. The extraction of the oil from the container 27 reduces the weight or pressure exerted upon this end of the switch and permits the switch 15 to be moved to close the circuit through the motor 11 and cause the other circuit to be opened. The movement of this switch in this direction causes the motor to be operated and the valve 28 controlling the flow of fuel to the burner 14 to be opened and the fuel to be ignited by virtue of the fact that the oil is at this time extracted from the container. The motor continues to operate for a short period after this switch has been thrown and affects a portion of the secondary switch which cuts the heat coil out of the circuit and renders the motor inoperative, leaving the fuel valve in an open condition. As the burner continues in operation the water becomes heated, and when heated to a certain degree the contents of the expansion chamber are caused to expand, the pressure due to this expansion is exerted upon the oil 23 which causes the latter to be moved and discharged into the container 27 of the switch generally designated 15, which overbalances the opposite end of said switch and again causes the switch to assume the position shown in Figure 3, which closes the circuit to the motor 11 and causes it to be actuated for a period sufficient to close the fuel valve 28, and to actuate a portion of the second mentioned switch in which position the parts are brought at rest and maintained until the temperature of the water is again reduced, when the hereinbefore explained operation will be automatically repeated. It is, of course, understood that the amount of oil 23 contained in the apparatus is measured so that it cannot overflow from the container 27 when the parts assume the position shown in Figure 3.

The switch generally designated 15 or the primary switch, includes a rocker arm 29 which is pivotally connected to the support 30. This rocker arm 29 is provided with a suitable insulator 31, so that current is prevented from passing from one end of the arm to the other. The container or receptacle 27 is mounted at one end of the rocker arm 29 and also carries the electrode 32, which is arranged to close the circuit through the electrolyte 33 confined in the cup 34, when this end of the rocker arm is lowered by the weight of the oil contained in the container 27. The opposite end of the rocker arm carries another electrode 35 and this end of the arm is weighted by means of the weights 36 employed to overbalance the rocker arm 29 when the oil contained in the receptacle 27 is extracted therefrom. This electrode 35 is designed to cooperate with the electrolyte 33 contained in the cup 37 when the rocker arm 29 is moved to permit of this.

A stop 37' is employed and secured to the container 37. This stop is provided to limit the downward movement of the adjacent end of the rocker arm 29 so that the device cannot be actuated when the liquid level is reduced below a certain depth. The opposite end of said arm is permitted to move its full extent, which permits this end to contact with the liquid and insure the various elements employed in the structure to be brought to a point of rest.

A pipe connection 38 is employed which connects the cups 34 and 37 together so that the electrolyte contained in these cups may flow from one cup to the other and maintain a corresponding liquid level in said cups. A means generally designated 39 is employed for maintaining the proper liquid level in the cups 34 and 37 and in the passage 38, and thereby compensate for the evaporation or dissipation of the electrolyte contained in these cups.

This means includes a receptacle 40 having the mouth 41 which is designed to be inserted and arranged within the cup 42. When the receptacle 40 is arranged in this last named position the electrolyte contained in this receptacle is permitted to flow into the receptacle 42 and the cups 33 and 37 until the liquid in these cups reaches the mouth of the receptacle which seals the mouth thereof and prevents the fluid in the receptacle from flowing from the receptacle to the cups, until said liquid level is reduced, at which time the liquid will flow from the receptacle and maintain the required level in said cups.

A pipe connection 43 is made between the receptacle 42 and the pipe connection 38 which will thus permit the electrolyte to flow from the receptacle 42 into the cups 34 and 37 as it is discharged from the receptacle 40.

A conductor 44 is connected to the rocker arm 29 of the switch 15. This conductor leads to the heat coil 13 and thence to the contact 45 of the secondary switch generally designated 46, which switch is mounted upon the gear box 12 and includes the movable element 47 and the spring contact 48. A conductor 74 leads from this contact making element 48 to the motor 11, and another conductor 75 leads from the motor to the transformer 10, the latter of which is connected to the line. Another conductor 49 is connected to the cup 37 of the switch 15 and this conductor is connected to the transformer 10. The element 47 of the secondary switch 45 is in contact with the contact springs 46 and 48 when the parts are in the position shown in Figure 3, thus immediately upon the switch 15 assuming the dotted line position shown in Figure 3, by the action of the weighted portion 36 and the removal of the fluid 23 from the container 27, the electrode 35 carried by this end of the rocker arm is immersed in the electrolyte contained in the cup 37, which closes the circuit from the conductor 49 to the heat coil 13, the latter of which becomes heated and in readiness to ignite the fuel prior to its escape from the burner 14. The circuit leading from the coil 13 to the motor, is, as before stated, closed by the contact 47 which will cause the motor to be actuated to turn on the fuel valve 28. At a certain period of the operation of the motor the contact 47 is actuated and the circuit broken, which stops the motor and extinguishes the heat coil, leaving the fuel valve open and the fuel ignited. By referring to the diagrammatic view of the circuit it will be noted that the motor and coil are connected in series, thus should the heat coil be rendered ineffective subsequently to the ignition of the fuel, the motor cannot be operated to open the valve controlling the fuel.

The function and operation of the element 47 of the switch 46 will be more clearly understood from the following explanation of the operation of the device:

When the parts are in the position shown in Figure 3 it is evident that the circuit arrangement just described is opened and the apparatus is at rest, however, upon the reduction of the temperature of the water in the system the atmosphere or contents of the chamber 18 will be contracted. This will cause the oil 23 to be drawn from the cup 27. Upon the withdrawal of the oil from the cup the weighted element 36 overcomes the weight of the cup and causes the electrode 35 to be immersed in the electrolyte 33 contained in the cup 37. This closes the circuit which is completed through the electrolyte in this cup and permits current to flow through the conductor 49, electrolyte container 37, electrode 35, rocker arm 29, and the conductor 44 which is connected to the rocker arm, and, by virtue of the fact that the heat coil 13 is in circuit with the conductor 44, it will become heated. Current flows from the transformer 10 through conductor 49, rocker arm 29, heat coil, to the contact making element 47, motor 11, the transformer 10. This causes the actuation of the motor 11. The motion thereof is transmitted by means of the gears 50 and 51, to the shaft 52 having the worm 53, the latter of which meshes with the worm wheel 54 arranged upon the shaft 55. This shaft 55 is also provided with a worm 56 which meshes with the worm wheel 57 carried by the shaft 58, the latter of which carries the two cams 59 and 60 and in addition has secured to it the crank arm 61, from which the link 62 extends, to form a connection between the valve 28 controlling the fuel passage to the burner, so that this valve may be operated upon the actuation of the motor. The cams 59 and 60 are provided to actuate the contact making elements 47 and 63, clearly shown in Figure 2, the latter of which are respectively provided with rods 64 and 65, the opposite ends of which rest and ride upon the surfaces of the cams 59 and 60 which when actuated move the rods 64 and 65 towards the contact making elements 45, 48, 70 and 71 carried by the gear box 12. These rods 64 and 65 are held in contact with the cams by means of coiled springs, such as 66, which react between the cover plate 67 of the gear box and the pin 68. The cams 59 and 60 are designed to produce the cut-away portion 69 which permits the rods such as 64 and 65 and the contact making elements 47 and 63 to drop away from the contact making elements 45 and 48, 70 and 71 when this cut-away portion is arranged with relation to the rods to permit of this.

These portions 69 of the respective cams 59 and 60 are arranged diametrically opposite each other so that when said cams are rotated the rods 64 and 65 will be alternately raised and lowered to thereby open and close the circuit between them and their respective contact springs, such as 45, 48, 70 and 71 in the proper time in the cycle of operation.

The use of the worm and worm wheels and the parts which cooperate therewith appreciably reduces the effect or speed of the motor upon these parts, and the crank arm which actuates the valve 28 and controls the flow of fuel to the burner, as it is understood that this arm need only to be operated one complete revolution to open and close said valve.

When the rocker arm is moved to the dotted line position shown in Figure 3, it will be remembered that the heat coil has been actuated and extinguished, the fuel ignited and the fuel valve opened and left in this position.

After the water in the system has been heated to the proper degree, the contents of the chamber 18 become expanded. This expansion causes a pressure to exist and this pressure is exerted upon the oil 23, which causes said oil to be discharged from the end of the pipe or passage 25 into the receptacle 27 carried by the rocker arm 29 of the switch generally designated 15.

This oil or fluid continues to flow into the receptacle 27 until the weight thereof overcomes the weight 36 provided upon the opposite end of the rocker arm 29. This causes the end of the rocker arm 29 carrying the receptacle to be moved downwardly, lifting the electrode 35 out of the electrolyte 33 contained in the receptacle 37, and causes the electrode 32 to be immersed or brought into contact with the electrolyte 33 contained in the cup 34. At this time the contact making element 63 of the secondary switch 12 is in contact with contact making elements 70 and 71, which permits current to flow from the line through the transformer 10, through the conductor 49, the electrolyte contained in the receptacle or cup 37 and pipe connection 38, through the electrode 32, arm 29, conductor 72, which is secured to the rocker arm 29, through the resistance 73, contact making elements 70 and 71, and 63, conductor 74, motor 11, transformer 10. The purpose of the resistance 73 is to counter-balance the resistance of the ignition coil 13 so that the motor will operate under the same electrical conditions whether the current is passing through the circuit including the ignition coil 13 or the circuit including the resistance 73.

At a certain period in the operation of the device, the movable contact making element 63 moves out of contact with the contact making elements 70 and 71, which breaks the circuit and causes the various elements entering into the construction to be brought at rest or to the position shown in Figure 3. It is understood that during this period the crank arm 61 has been operated to cause the valve 28 controlling the fuel passage to the burner to be closed, and in view of the fact that the portion 69 of the respective cams 59 and 60 are disposed diametrically opposite to each other, the contact making element 47 will be moved upwardly into contact with the contact making elements 45 and 48, substantially, simultaneously with the downward movement with the contact making element 63. The relative position of the contact making element 47 will permit the circuit to be completed and cause current to flow to the heat coil 13 immediately when the switch generally designated 15 assumes the dotted line position shown in Figure 3, which will also start the motor and open the valve 28 subsequently to the heating of the coil 13. Upon the rotation or actuation of the motor 11 the contact making element 47 is moved away from the contact making elements 45 and 48, which breaks the circuit to the heat coil 13. Upon the downward movement of the element 47 the contact making element 63 is raised into contact with the contact springs 70 and 71 positioning these parts so that the circuit may be closed when the switch 15 is moved from the shut off position or the position shown in full lines in Figure 3.

From the foregoing description of the apparatus it is evident that a relatively simple structure is provided for accomplishing the invention which is minus many objectionable features such as are now contained in the other devices of a similar character.

The elimination of the constantly burning pilot light with the possibility of its being accidentally extinguished with the fuel escaping through the burner being entirely eliminated.

It is further evident that a means is employed for controlling the switch 15 which is extremely accurate, is minus any moving mechanical parts and which can be depended upon to properly actuate the various instrumentalities dependent upon it, when this becomes necessary.

It is further evident that the element to be heated such as water will be uniformly heated even though the water pressure be relatively low.

By employing a heat coil in circuit with the motor the accidental escape of the fuel or actuation of the valve which controls the flow of fuel to the burner cannot be accomplished because should the heat coil be accidentally rendered inoperative the motor cannot be actuated nor can the fuel be turned on.

It is further evident that should the heat coil be rendered useless subsequently to the ignition of the fuel that the apparatus will prevent the flow of fuel to the burner after the water has been heated to the desired degree and will not permit the flow of fuel to the burner after the temperature of the water is reduced.

Having thus described the invention, what we claim and desire to cover by Letters Patent is:

1. In a temperature regulator, a thermostat including an expandable and contractable fluid, an electric switch controlled by said thermostat, said switch including a fluid conductor, a fluid fuel supply, an electrically controlled motor controlling said fuel supply, electric ignition means, and additional electric switches, said motor and said ignition means controlled by said first mentioned switch and said additional switches controlled by said motor.

2. In a temperature regulator, a thermostat including an expandable and contractable fluid, an electric switch controlled by said thermostat, said switch including a fluid conductor, a fluid fuel supply, a motor controlling said fuel supply, electric ignition means, and additional electric switches, said motor and said ignition means controlled by said first mentioned switch and said additional switches controlled by said motor, and in turn controlling said motor and said ignition means.

3. In a temperature regulator, a thermostat including an expandable and contractable fluid, an electric switch controlled by said thermostat, said switch including a fluid conductor, a fluid fuel supply, an electrically controlled motor controlling said fuel supply, electric ignition means, and an additional electric switch, said motor and said ignition means controlled by said first mentioned switch and said additional switch controlled by said motor.

4. In a temperature regulator, a thermostat including an expandable and contractable fluid, an electric switch controlled by said thermostat, said switch including a fluid conductor, a fluid fuel supply, a motor controlling said fuel supply, electric ignition means, and an additional electric switch, said motor and said ignition means controlled by said first mentioned switch and said additional switch controlled by said motor, and in turn controlling said ignition means.

5. In a temperature regulator, a thermostat including an expandable and contractable fluid, an electric switch controlled by said thermostat, said switch including a fluid conductor, a fluid fuel supply, a motor controlling said fuel supply, electric ignition means, and an additional electric switch, said motor and said ignition means controlled by said first mentioned switch and said additional switch controlled by said motor, and in turn controlling said motor.

In witness whereof, we hereunto subscribe our names this 10th day of June, 1925.

SAMUEL T. HINDENACH.
HENRY W. HUNTLEY.
JOHN G. BRADFORD.
JULIAN G. GOODHUE.